(12) United States Patent
Elsey (10) Patent No.: US 6,845,155 B2
(45) Date of Patent: Jan. 18, 2005

(54) TECHNIQUE FOR EFFECTIVELY PROCESSING AND DYNAMICALLY ROUTING COMMUNICATION CALLS

(75) Inventor: Nicholas J. Elsey, West Linn, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 596 days.

(21) Appl. No.: 09/861,777

(22) Filed: May 21, 2001

(65) Prior Publication Data
US 2002/0172347 A1 Nov. 21, 2002

(51) Int. Cl.$^7$ ............................................. H04M 3/00
(52) U.S. Cl. ............................ 379/266.04; 379/265.02
(58) Field of Search .................... 379/265.01, 265.02, 379/265.03, 265.09, 265.1, 265.11, 265.12, 265.13, 265.14, 266.01, 266.03, 266.04, 266.05, 266.06, 266.08

(56) References Cited

U.S. PATENT DOCUMENTS

| | | | |
|---|---|---|---|
| 4,284,852 A | | 8/1981 | Szybicki et al. |
| 4,669,113 A | | 5/1987 | Ash et al. |
| 4,737,983 A | | 4/1988 | Frauenthal et al. |
| 4,788,721 A | | 11/1988 | Krishnan et al. |
| 4,942,602 A | | 7/1990 | Baker, Jr. et al. |
| 4,949,373 A | | 8/1990 | Baker, Jr. et al. |
| 4,979,118 A | | 12/1990 | Kheradpir |
| 5,068,892 A | | 11/1991 | Livanos |
| 5,142,570 A | | 8/1992 | Chaudhary et al. |
| 5,153,909 A | | 10/1992 | Beckle et al. |
| 5,164,983 A | * | 11/1992 | Brown et al. .......... 379/265.03 |
| 5,168,515 A | | 12/1992 | Gechter et al. |
| 5,271,058 A | | 12/1993 | Andrews et al. |
| 5,295,183 A | | 3/1994 | Langlois et al. |
| 5,299,259 A | * | 3/1994 | Otto ....................... 379/266.04 |
| 5,384,841 A | | 1/1995 | Adams et al. |
| 5,530,744 A | * | 6/1996 | Charalambous et al. ...................... 379/266.08 |
| 5,590,188 A | | 12/1996 | Crockett |
| 5,680,448 A | | 10/1997 | Becker |
| 5,684,870 A | | 11/1997 | Maloney et al. |
| 5,724,419 A | | 3/1998 | Harbuziuk et al. |
| 5,754,639 A | * | 5/1998 | Flockhart et al. ....... 379/266.05 |
| 5,787,163 A | | 7/1998 | Taylor et al. |
| 5,915,012 A | * | 6/1999 | Miloslavsky ........... 379/265.02 |
| 5,920,621 A | | 7/1999 | Gottlieb |
| 6,038,308 A | | 3/2000 | Anthos et al. |
| 6,055,307 A | * | 4/2000 | Behnke et al. ......... 379/265.14 |
| 6,233,333 B1 | * | 5/2001 | Dezonmo ................ 379/266.1 |
| 6,490,350 B2 | * | 12/2002 | McDuff et al. ........ 379/265.06 |
| 6,625,275 B1 | * | 9/2003 | Miyauchi ............... 379/266.04 |

* cited by examiner

Primary Examiner—Bing Q. Bui
(74) Attorney, Agent, or Firm—Kay Scholer LLP

(57) ABSTRACT

In an arrangement where calls are directed to different call centers, each call center based on selected metric measures determines whether an incoming call is an "overflow" call to be rerouted to an alternate call center. These metric measures may include, e.g., the number of operators in the call center answering calls, the number of calls in queue to be answered, etc. Once an overflow call is identified, the call center reserves an outbound communication channel in anticipation of rerouting the call, and transmits a call rerouting request to a call routing server. In accordance with the invention, the server identifies an appropriate alternate call center for receiving the overflow call, and communicates routing information including an identity of the alternate call center to the overflow call center. The latter based on the received routing information transfers the call to the appropriate alternate call center.

73 Claims, 5 Drawing Sheets

| LIO(r) / CIQ(t) | R | R-1 | ... | 3 | 2 | 1 |
|---|---|---|---|---|---|---|
| 1 | Y | Y | | Y | Y | Y |
| 2 | Y | Y | | Y | Y | Y |
| ⋮ | | | | | | |
| T-1 | Y | Y | | N | N | N |
| T | Y | N | ... | N | N | N |

503 points to the Y in row 1, column R. 507 points to the N in the bottom-right block.

FIG. 6
610

$$\begin{bmatrix}
\overbrace{\phantom{X}}^{615} & \overbrace{\phantom{X}}^{617} & \overbrace{\phantom{X}}^{619} \\
1 & 1 & Y \\
2 & 1 & Y \\
\vdots & \vdots & \vdots \\
R & 1 & Y \\
1 & 2 & Y \\
2 & 2 & Y \\
\vdots & \vdots & \vdots \\
R & 2 & Y \\
1 & 3 & Y \\
2 & 3 & Y \\
\vdots & \vdots & \vdots \\
1 & T & N \\
2 & T & N \\
\vdots & \vdots & \vdots \\
R & T & Y
\end{bmatrix}$$

631 → points to row (R, 1, Y)
635 → points to row (1, T, N)

TECHNIQUE FOR EFFECTIVELY PROCESSING AND DYNAMICALLY ROUTING COMMUNICATION CALLS

FIELD OF THE INVENTION

The invention relates generally to a communications system and method, and in particular to a system and method for processing and controlling a flow of communication calls.

BACKGROUND OF THE INVENTION

It is commonplace that large companies and information service providers set up call centers in different geographic areas to handle telephone inquiries from customers. After receiving one such customer call, a call center normally assigns the call to an appropriate service representative, operator and/or interactive voice response (IVR) unit therein to attend to the call. For example, a customer of an information service provider may call a designated number for information, and the call is then routed to a call center where an operator can provide the customer with the desired phone numbers and addresses of particular persons and establishments, directions, movie listings, restaurant recommendations, etc.

A call center sometimes may be deluged with telephone calls such that the operators cannot answer all calls immediately after the calls come in. In that case, the calls are queued in the call center and answered in accordance with an automatic call distribution (ACD) algorithm. As a result, a caller may experience a long wait time and feel frustrated. To reduce such a wait time, techniques have been developed to route call traffic to multiple call centers to balance the load among them. One such prior art technique requires that each call received by a call center be automatically forwarded to a central switch location where a routing server identifies the call center to which the call is routed. However, this technique may actually cause a delay in answering those calls which can otherwise be answered immediately by the receiving call center. This stems from the aforementioned requirement that each call without exception needs to be forwarded to the central switch location before it is routed to a call center to be answered.

Another prior art technique involves routing overflow calls in a call center to other call centers in a predetermined sequence. That is, overflow calls in call center A are always routed to call center B, overflow calls in call center B always to call center C, and so on and so forth. An incoming call to a call center becomes an overflow call when it is queued in the call center longer than a predetermined period. However, a major shortcoming of this technique is its inflexibility to route overflow calls in a call center to any available call center not next thereto in the sequence. For example, an overflow call in call center A would be routed to call center B even if call center B has insufficient capacity to handle the call while another call center has ample capacity to handle it.

Accordingly, there exists a need for a technique for effectively identifying overflow calls in a call center, and dynamically routing the overflow call traffic to other available call centers to handle the overflow calls.

SUMMARY OF THE INVENTION

In accordance with the invention, an incoming call to a call center is identified as an overflow call, which needs to be rerouted to an alternate call center, based on measures of conditions concerning the call center. Such measures include, e.g., the number of calls being queued in the call center to be answered, the number of operators in the call center attending to the calls, etc. Once an incoming call is designated an overflow call, an attempt to reserve a communication path for transporting the call out of the call center (the "overflow call center") is made. If the attempt is successful, a request for rerouting the call to an alternate call center is issued to a remote call routing server. The latter keeps track of availability of each call center to receive an overflow call, and determines its availability based on, e.g., periodic measures of conditions concerning the call center. Of the identified available call centers, the server may further determine whether any identified call center is an appropriate alternate call center for the overflow call to maintain the quality of service (QOS) of the overflow call center. For example, calls from an overflow call center may not be transferrable to any alternate call center unless the alternate call center is within the same region as the overflow call center to take advantage of the local knowledge of the operators in the alternate call center. After the server identifies the appropriate alternate call center, it communicates rerouting information including an identity of the alternate call center to the overflow call center. In response to such information, the overflow call center transfers the overflow call to the alternate call center through the earlier reserved communication path.

In an alternative embodiment, before a call from a communication network is routed to any call center, a processor in the network queries the remote call routing server for an appropriate call center to which the call is routed, thereby avoiding an overflow condition in the receiving call center and rerouting the call.

In another embodiment, as a disaster recovery measure, a call originally directed to a call center which is out of commission is switched to another network where a processor queries the call routing server for an appropriate call center to which the call is transferred. Based on a response from the server, the call which otherwise goes unanswered is then routed to the appropriate call center to be answered.

BRIEF DESCRIPTION OF THE DRAWINGS

Further objects, features and advantages of the invention will become apparent from the following detailed description taken in conjunction with the accompanying drawing showing an illustrative embodiment of the invention, in which.

DETAILED DESCRIPTION

The present invention is directed to a technique for processing and dynamically routing calls to call centers. In accordance with the invention, an incoming call to a call center may be identified as an "overflow call" based on measures of metrics pertaining to the call center. As soon as one such overflow call is identified, the call center may cause the overflow call to be rerouted to an alternate call center which can more readily answer the call. For efficiency reasons, the call center reserves in advance an outbound telecommunication channel through which the overflow call is to be transferred before it sends to a call routing server a request for rerouting the overflow call. In response, such a server identifies any alternate call center to which the overflow call is to be rerouted.

Figure 1:
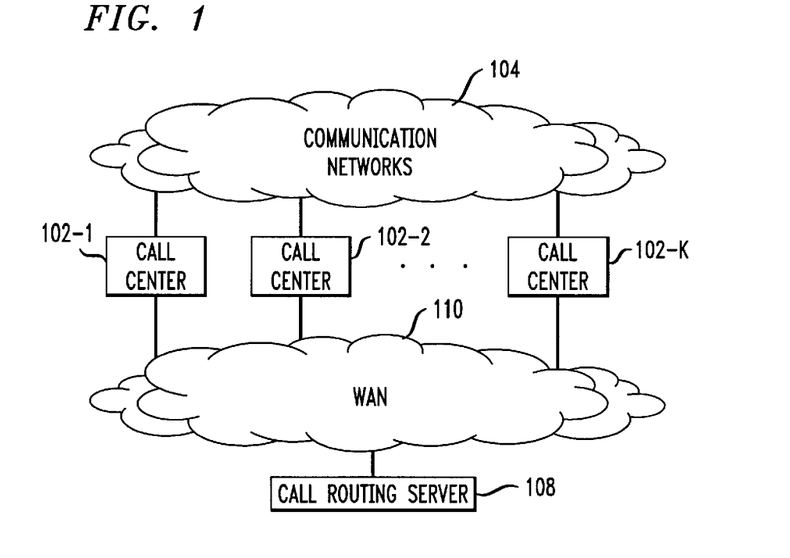
FIG. 1 illustrates an arrangement where a call to a call center may be rerouted to an alternate call center to be answered in accordance with the invention.

FIG. 1 illustrates an arrangement embodying the principles of the invention where call centers 102-1, 102-2, . . . 102-K receive customer calls from communication networks 104, where K represents a predetermined number greater than one. Networks 104 here generically include a public switched telephone network (PSTN), packet switched network (e.g., voice over Internet protocol (VoIP) based), wireless communication network, etc. In this illustrative embodiment, operators in call centers 102-1 through 102-K provide an information service where a calling customer may obtain from an operator the desired phone numbers and addresses of particular persons and establishments, directions, movie listings, restaurant recommendations, etc. It should be pointed out that the term "operator" here broadly encompasses entities that are capable of providing assistance in a telecommunication environment, including without limitation human operators, voice response/recognition capabilities, web-enabled operator services, and other electronic access. Illustratively, each of call centers 102-1 through 102-K is connected to call routing server 108 via wide area network 110, and/or an intranet, the Internet, etc. Server 108 responds to requests from the call centers for rerouting overflow calls in a call center to an alternate call center, in accordance with the invention.

Figure 2:
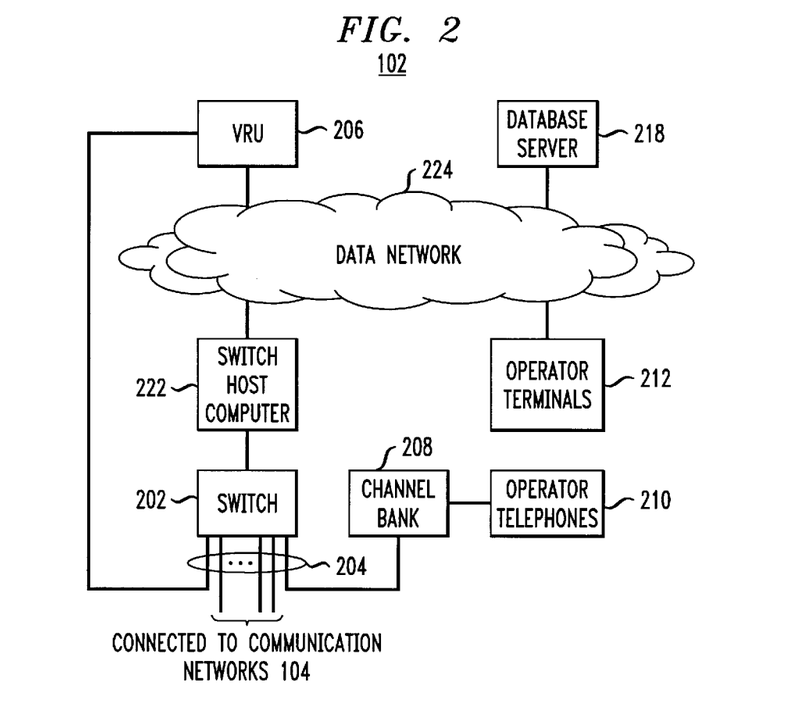
FIG. 2 is a block diagram of a call center in accordance with the invention.

FIG. 2 illustrates call center 102 generically representing one of call centers 102-1 through 102-K. Call center 102 includes switch 202 having T1 spans 204 for connection to voice response unit (VRU) 206, channel bank 208, and communications networks 104. Channel bank 208 is used to couple multiple operator telephones 210 to switch 202. The operators in call center 102 are further equipped with operator terminals 212, each of which includes a video display unit and a keyboard with an associated dialing pad. Operator terminals 212 are connected over data network 224 to database server 218. The latter provides, e.g., directory information, movie listings, restaurant recommendations, weather and traffic information, etc. Switch host computer 222 and VRU 206 are also connected to data network 224. By way of example, data network 224 includes a local area network (LAN) supplemented by a number of point-to-point data links, and connected to WAN 110.

Center 102 may receive an incoming call from communication networks 104 through a carrier switching center therein. It also places outgoing calls through one of networks 104 which may be different than that used for the incoming call. Switch 202 is conventional which includes digital signal processing circuitry providing the requisite conference capability, and DTMF and multi frequency (MF) tone generation/detection capabilities. In this illustrative embodiment, switch 202 supports digital T1 connectivity. The operation of switch 202 is governed by instructions stored in switch host computer 222.

VRU 206 is used to play the constant repeated parts of an operator's speech, namely, the various greetings and signoffs (or closings). VRU 206 is connected via data network 224 to switch host computer 222 and via one or more T1 spans to switch 202. At appropriate stages in a call progression, switch host computer 222 initiates a voice path connection between VRU 206 and switch 202 such that the user, or the user and the operator, are able to hear whatever pre-recorded speech is played on that connection by VRU 206. Computer 222 then instructs VRU 206, via data network 224, what type of message to play, and passes data parameters that enable VRU 206 to locate the message appropriate to the call state.

Each incoming call from a user is received by switch 202 in center 102 which connects it to an available operator's telephone. If no operator is available when a call is received, the call is queued. At the same time, switch host computer 222 in accordance with the invention determines whether the received call should be accorded an "overflow call" status based on measures of metrics pertaining to call center 102, which are registered in computer 222. If the call is identified as an overflow call, computer 222 further arranges to have the overflow call rerouted to an alternate call center for answering. In this example, the call metrics include, but not limited to, the following:

(1) Call Abandonment (CA) metric—this metric indicates the percentage of callers that have hung up after experiencing a set answer delay, e.g., 24 seconds in this instance. A relatively high CA metric value indicates that a relatively high percentage of calls received by call center 102 were abandoned by the callers because of a long answer delay. Thus, one may want to set a maximum limit on the CA metric value, say, 20%, to meet a certain quality of service (QOS) requirement. When the CA metric value exceeds the maximum limit, an incoming call received by the call center is very likely to be designated by computer 222 an overflow call.

(2) Calls in Queue (CIQ) metric—this metric measures the number of incoming calls waiting in the queue to be answered by receiving call center 102. The higher the CIQ metric value, the higher the likelihood that an incoming call would be designated an overflow call. The CIQ metric value may be weighted against the number of logged in or active operators in call center 102, indicated by metric value (5) below. This stems from the fact that the more (fewer) active operators in the call center, the more (fewer) calls in the queue they can manage to maintain the appropriate wait time. Thus, the CIQ metric value relative to the number of active operators may be more effective in determining whether an incoming call should be designated an overflow call.

(3) Direct Call Processing Time (DCPT) metric—this metric indicates the average duration of a call after the call is picked up by an operator in call center 102, thereby measuring the efficiency of the operators answering the incoming calls. The higher the DCPT metric value, the more likely that an incoming call is designated an overflow call. For example, a high DCPT value may be a minute or more.

(4) H metric—this metric measures the number of calls processed per hour by the operators in call center 102. The higher the H metric value, i.e., the larger the number of calls answered by the operators per hour, the less likely that an incoming call would be designated an overflow call. Like the CIQ metric, the H metric may be weighed against the number of active operators, indicated by metric value (5) below, as what constitutes a high H metric value depends on the number of active operators in call center 102.

(5) Logged in Operators (LIO) metric—this metric measures the number of operators who have logged in the system to answer calls in call center 102. As mentioned before, this metric may be considered in combination with other metrics such as the CIQ and H metrics.

(6) Longest Queue Time (LQT) metric—this metric measures the longest queue time for any incoming call waiting in the queue to be answered. Incoming calls would likely be designated overflow calls if the LQT metric value exceeds a predetermined threshold.

(7) Rerouted Inbound Calls in Progress (RICIP) metric—this metric measures the number of overflow calls being rerouted to call center 102 acting as an alternate call center. A high RICIP metric value indicates a high rate of acceptance of overflow calls in call center 102, and the call center is likely to not designate any incoming call an overflow call since the call volume is manageable.

(8) Rerouted Outbound Calls in Progress (RICIP) metric—this metric measures the number of overflow calls being rerouted from call center 102 to an alternate call center. If call center 102 is already rerouting many of its incoming calls, it is likely that call center 102 would need to continue to designate an incoming call an overflow call and reroute same.

(9) Outbound Channels Available for Rerouting (OCAFR) metric—this metric measures the number of channels or circuits available for transporting a call out of call center 102. The lower the OCAFR metric value, the less likely that call center 102 would designate an incoming call an overflow call since the overflow call requires an outbound channel for transferring it to an alternate call center, unless the call is routed out via a VoIP connection.

(10) Time Service Factor (TSF) metric—this metric measures the percentage of calls answered in call center 102 within a predetermined time limit, e.g., 24 seconds, to meet a QOS requirement. The higher the TSF metric value, the more likely that an incoming call would not be designated an overflow call.

Figure 3:
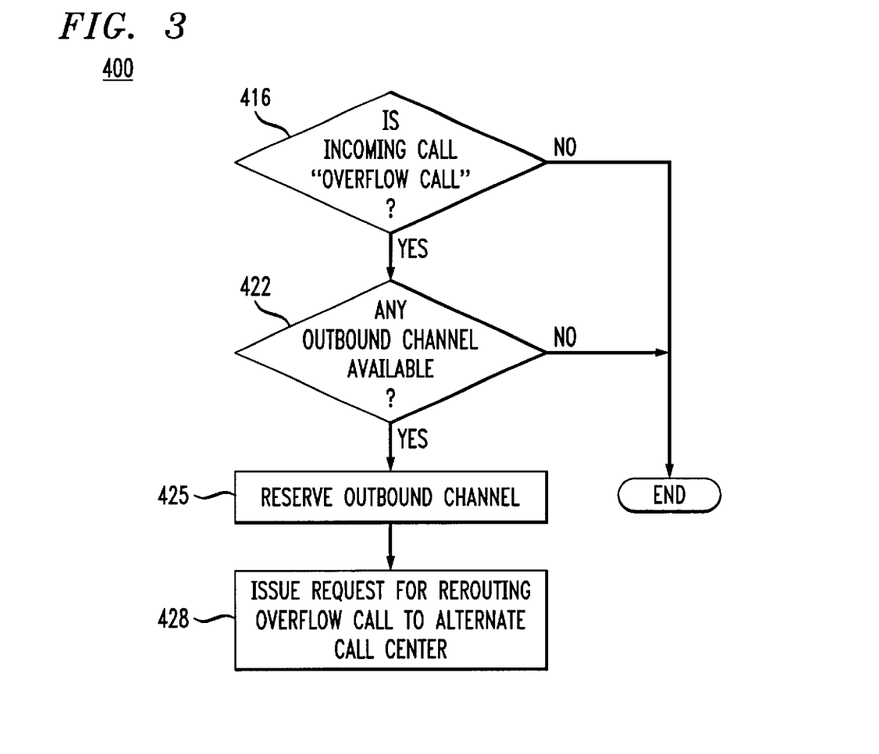
FIG. 3 is a flow chart depicting a routine for identifying and processing an overflow call in a call center in accordance with the invention.

In accordance with the invention, a call control routine stored in computer 222 is invoked each time when an incoming call to call center 102 is not answered immediately and thus placed in a queue. FIG. 3 illustrates such a call control routine, which is denoted 400. Instructed by routine 400, computer 222 at step 416 determines whether the incoming call should be designated an "overflow call." For example, computer 222 checks whether the LQT metric measure at that time exceeds a first configurable threshold (e.g., 24 seconds), whether the CA metric measure in the current five minute window exceeds a second configurable threshold, whether the CIQ metric measure exceeds a third configurable threshold, whether the LIO metric measure does not exceed a fourth configurable threshold, and/or whether OCAFR metric measure does not exceed a fifth configurable threshold. If the result of one or more of these tests turns out to be negative, computer 222 designates the incoming call in the queue a non-overflow call. As a consequence, routine 400 comes to an end, and the incoming call remains in the queue. Otherwise, if the result of one or more of these tests turns out to be positive, computer 222 designates the incoming call in the queue as an overflow call. In addition, computer 222 at step 422 determines whether an outbound communication channel in T1 span 204 is available, in anticipation of using such an outbound channel to reroute the overflow call from call center 102 to an alternate call center. If no outbound channel is available, routine 400 again comes to an end, and the incoming call remains in the queue. Otherwise, if an outbound channel is available, computer 222 at step 425 reserves such an outbound channel. In addition, computer 222 at step 428 issues a request to call routing server 108 via WAN 110 for rerouting the overflow call to an alternate call center. If server 108 responds to the rerouting request with routing information including an identity of the alternate call center, computer 222 then causes switch 202 to reroute the overflow call to the identified call center through the reserved outbound channel. Otherwise, if server 108 denies the rerouting request, computer 222 causes the previously reserved outbound channel to be released for other uses.

It should be noted at this juncture that an incoming call may be accorded priority over other calls in queue to be answered by an operator. Such priority may be identified based on call set up signals, e.g., an automatic call identifier (ANI), received by switch 202 in establishing the incoming call. As is well known, the ANI indicates the telephone number of the caller, or the mobile directory number (MDN) if the caller is a mobile phone user. Computer 222 consults therein a priority table where selected callers' phone numbers having a priority status are indicated. For example, the priority may be specified in terms of a priority value P relative to a predetermined value for a medium priority. Specifically, the priority may be measured on a five point scale, and the predetermined value for the medium priority is 3. In accordance with this priority scheme, the calls in queue having a priority value P are answered ahead of medium priority calls in the proportion of P out of (P+3) times. Thus, relatively high priority calls with P=5 are answered ahead of medium priority calls 5 out of 8 times. On the other hand, relatively low priority calls with P=1 on are answered ahead of medium priority calls 1 out of 4 times. In this instance, the default priority value of each incoming call is 3.

In accordance with an aspect of the invention, the denial by server 108 of a rerouting request may be accompanied by a request by server 108 for increasing or decreasing the priority of the overflow call. Accordingly, computer 222 causes the overflow call to be answered in server 102 in a shorter (longer) time in response to its increased (decreased) priority.

Figure 4:
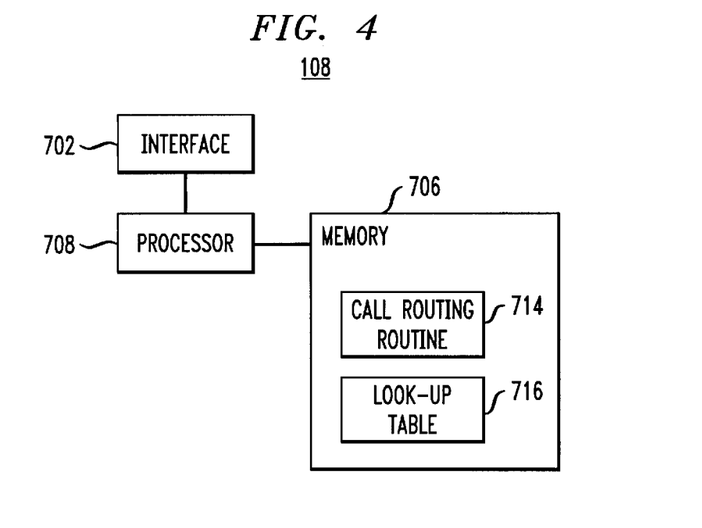
FIG. 4 is a block diagram of a call routing server in accordance with the invention.

FIG. 4 illustrates call routing server 108, including interface 702 through which server 108 is connected to WAN 110, processor 708, and memory 706 which contain, among others, call routing routine 714 and look-up table 716. In this illustrative embodiment, each of call centers 102-1 through 102-K from time to time, e.g., periodically, sends to server 108 a set of metric measures concerning the call center. The set of metric measures include the measures of one or more of the aforementioned metrics, and additional metrics which may be important for deciding the availability of a call center to receive an overflow call. For example, one such additional metric is an Inbound Channels Available for Rerouting (ICAFR) metric, which measures the number of channels or circuits available for receiving a call in a call center. The lower the ICAFR metric value, the less likely that the call center would be designated an alternate call center since it requires an inbound channel in the alternate call center to receive an overflow call. After receiving from each call center a set of metric measures concerning the call center, processor 708 looks up table 716 to determine the availability of the call center to receive an overflow call. The availability statuses of the respective call centers are then stored in a status table, and are updated periodically in this instance.

For example, the call center availability determination may be achieved by checking the metric measures received from a call center against look-up table 716. Table 716 includes different combinations of metric measures corresponding to an availability status in which the center becomes a candidate for receiving an overflow call.

Figure 5:
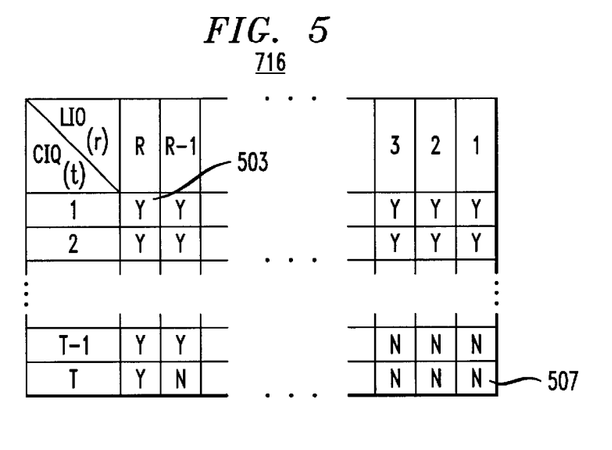
FIG. 5 illustrates an example of a look-up table in the routing server of FIG. 4.

FIG. 5 illustrates a simple example of table 716 assuming that only two metrics are relevant in determining the availability status. Specifically, in this simple example only the CIQ metric and LIO metric are assumed relevant and used. As mentioned before, the CIQ metric measures the number of calls in queue, and the LIO metric measures the number of logged in or active operators attending to incoming calls in a call center. In table 716 of FIG. 5, the upper limits of the CIQ and LIO metric values are represented by T and R, respectively, where T and R are both integers greater than zero. Based on the received measure of LIO metric, r, and measure of CIQ metric, t, processor 708 looks up table 716 to determine an availability status. For example, if (r t)=(R 1), the corresponding status is indicated in entry 503 in table 716, which is a "Y," i.e., an availability status. As another example, if (r t)=(1 T), the corresponding status is indicated in entry 507 in table 716, which is an "N," i.e., an unavailability status.

It should be noted that table 716 is a collection of results from manipulating the metrics in accordance with an underlying program which is a function of those metrics. This program is run by processor 708, and is dynamically modified in response to observed statistics and call patterns (e.g., daytime versus nighttime, and weekdays versus weekends) and other factors to meet QOS requirements. As a result, the entries and the make up of table 716 change dynamically. It should also be noted that the metrics in the program may be weighted by respective weights. For example, the aforementioned modification may be achieved by manipulating the respective weights of the metrics. These weights may be varied from time to time to amplify or reduce the effects of the metrics.

Figure 6:
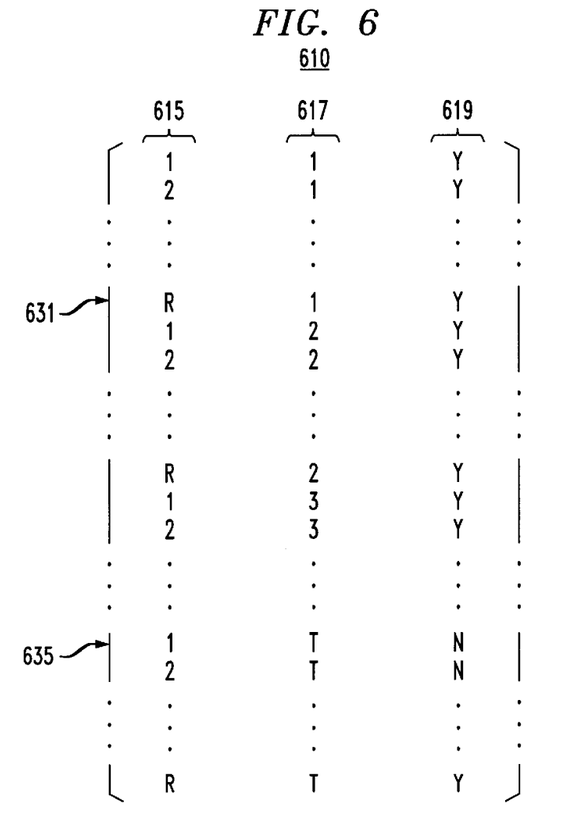
FIG. 6 illustrates another example of a look-up table in the routing server of FIG. 4.

Table 716 may also be expressed in the form of a matrix. For example, FIG. 6 illustrates such a matrix (denoted 610) containing the same information of the table of FIG. 5. As shown in FIG. 6, matrix 610 has TR rows and three columns, which incorporates different combinations of t values in column 615 and r values in column 617. For each combination of t and r appearing in a row, matrix 610 provides an indication of the corresponding unavailability status (indicated by "N") or an availability status (indicated by "Y") in the same row. For example, in row 631 where (r t)=(R 1), the corresponding status is "Y" as described before, and in row 635 where (r t)=(1 T), the corresponding status is "N" as described before. The matrix representation of table 310 is conducive to easy mathematical manipulation of metric values, especially when there are more than two metrics involved, which is the usual case. For consideration of each additional metric in determining an availability status, a column is added to matrix 610 containing different values of such an additional metric. Column 619 would then list the status indications corresponding to the resulting combinations. It should be noted that for some metric values, it may be more desirable to express them in terms of intervals and/or thresholds. For example, the DCPT metric values may be expressed in such intervals as 0 to 10 seconds, 11 to 20 seconds, 21 to 30 seconds, and over a 30 second threshold.

In another illustrative embodiment, business rules, as opposed to predefined code, are used to determine whether an overflow call should be rerouted or a call center is available to receive overflow calls. To that end, a well known business rule engine is employed, which may be of the type of Blaze Advisor software provided by Blaze Software, Inc., Mountain View, Calif. For example, by using one such business rule engine, the business rules may be expressed in a natural English-like language, which are easy for rule developers to write, and analysts to read and validate. The rules which would otherwise be hard-coded into procedural code are placed in a rulebase and can be devised and modified dynamically. The rules are translated into "software rules" which enable the rule processor (e.g., processor 708) to compile and execute.

Examples of business rules (expressed in English-like language) concerning rerouting an overflow call used in this illustrative embodiment are as follows:

(a) If longest wait time for a call>40 seconds in a call center, reroute overflow call from the call center;
(b) If the number of available operators<5 and longest wait time>20 seconds in a call center, reroute overflow call from the call center;
(c) If the number of operators>5 in a call center, the call center is available to receive overflow calls;
(d) If call is from XYZ carrier, do not reroute the call;
(e) If call center is being shut down, reroute all calls directed to the call center;
(f) If call is accorded relatively high priority (e.g., priority>3), do not reroute the call; and
(g) If caller's profile requires a Spanish speaking operator and call is rerouted, reroute the call to call centers in San Diego, Los Angeles or San Antonio.

It should be noted that rules (a) through (c) are devised based on aforementioned call center metric measures while (d) through (g) are instructions or exceptions apart from the metric measures.

Figure 7:
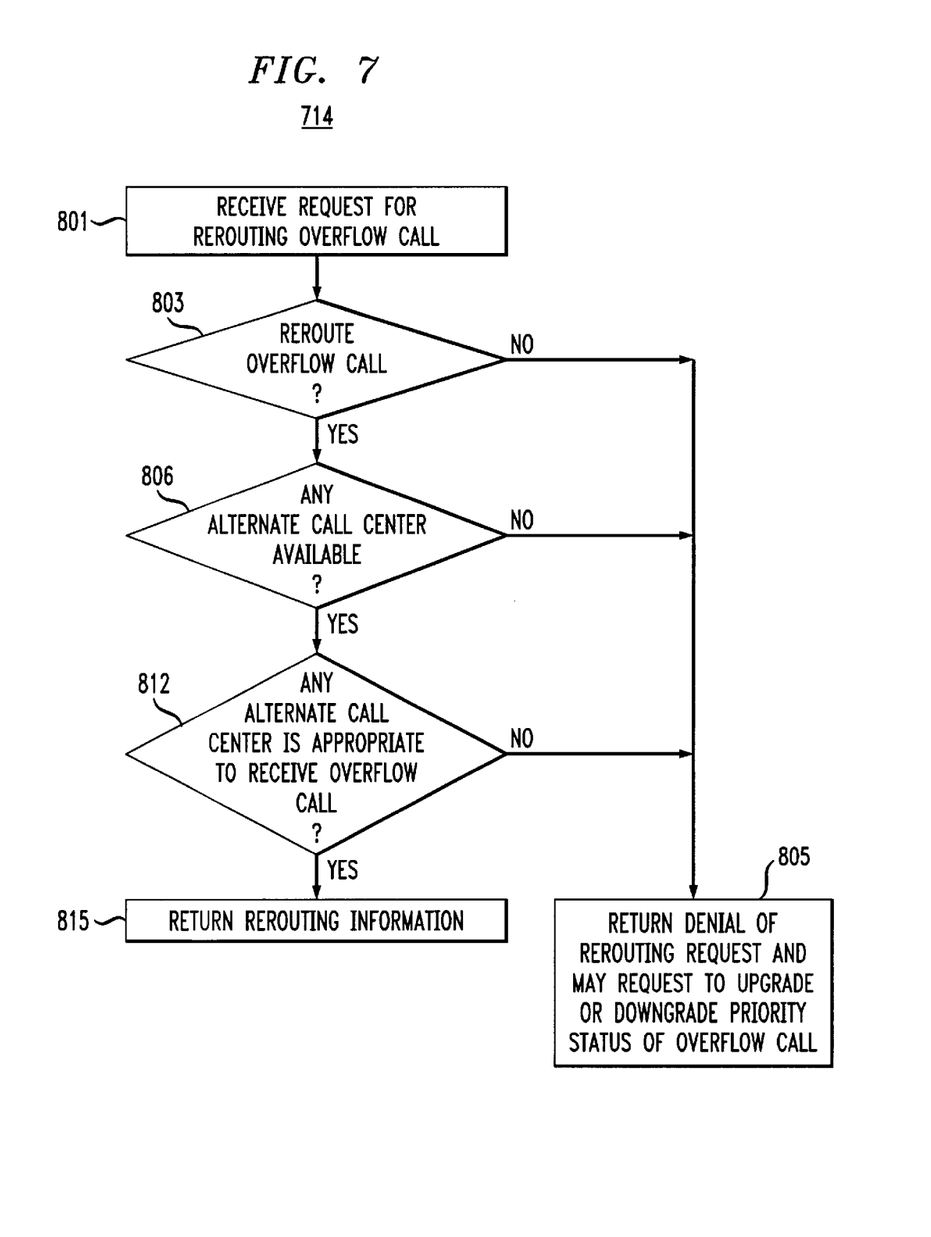
FIG. 7 is a flow chart depicting a routine for identifying an available call center to which an overflow call to be rerouted in accordance with the invention.

FIG. 7 illustrates call routing routine 714 run by processor 708. When processor 708 at step 801 receives a request for rerouting an overflow call from a call center, say, call center 102, processor 708 at step 803 determines whether the overflow call should be rerouted based, e.g., on the aforementioned business rules. If it is determined that the overflow call should not be rerouted, processor 708 at step 805 returns a denial of the rerouting request to computer 222, and at the same time may request computer 222 to upgrade (or downgrade) the priority status of the overflow call so that it would be answered in a shorter (or longer) time in call center 102. Otherwise, processor 708 identifies from the status table any alternate call centers available to receive an overflow call, as indicated at step 806. If no alternate call center is identified, routine 714 returns to step 805. Otherwise, if one or more alternate call centers are identified, processor 708 at step 812 determines whether any one of the alternate call centers is appropriate to receive the overflow call. In this illustrative embodiment, given a call center having an overflow call to be rerouted, not every alternate call center is a suitable recipient of the call. For example, limitations may be imposed that overflow calls from certain call centers can only be answered by operators in those alternate call centers within the same region or state to take advantage of the local knowledge of such operators. In general, without limitation, when given a choice between alternate call centers, the closest alternate call center to the overflow call center is preferred.

If processor 708 at step 812 identifies an appropriate alternate call center, processor 708 returns to computer 222 rerouting information including an identity of the selected alternate call center, as indicated at step 815. Otherwise, if processor 708 identifies no appropriate alternate call center, routine 714 returns to step 805 described above.

Figure 8:
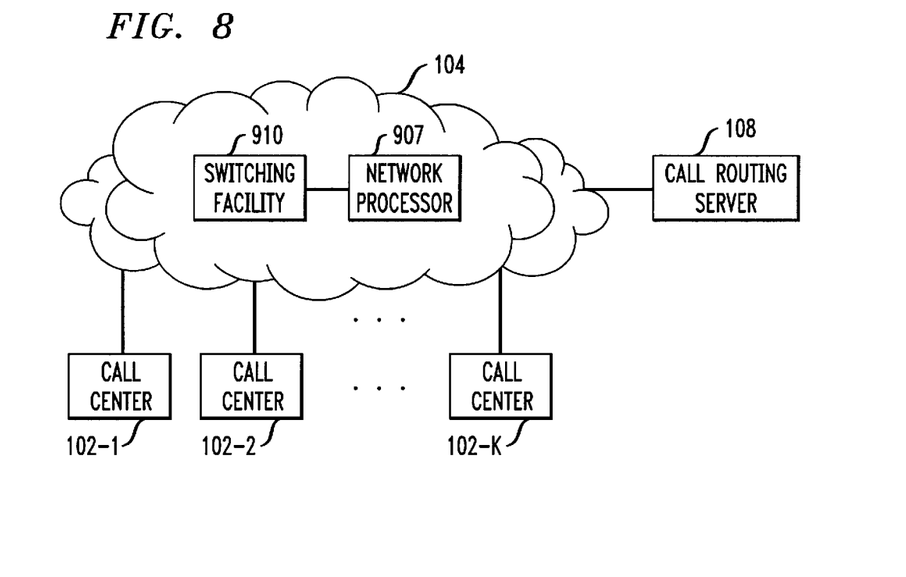
FIG. 8 illustrates a second arrangement where the call routing server provides routing information to a switching facility for switching calls to call centers in accordance with the invention.

FIG. 8 illustrates an arrangement for use in a second embodiment of the invention. In this embodiment, the routing of calls to call centers 102-1 through 102-K is orchestrated by network processor 907 in communication networks 104, with the help of call routing server 108. Specifically, when one such call to a call center at a predetermined telephone number is routed through switching facility 910, having learned the predetermined telephone number, facility 910 queries network processor 907 for an available call center to which the call is to be routed. In response, network processor 907 in turn queries call routing server 108 for such an available call center, e.g., via WAN 110. Server 108 then identifies any available call center to accommodate the call, in accordance with a routine similar to that of FIG. 8 although, here, server 108 is in communication with network processor 907, as opposed to a call controller in a call center. Once processor 907 receives from server 108 the routing information including an identity of the available call center, processor 907 communicates such information to facility 910 which then causes the call in question to be routed to the identified call center. This arrangement is particularly advantageous as the call center receiving the call should always be available to answer the call in the first instance, thereby avoiding the possible need of rerouting the call after it is received in a call center.

Figure 9:
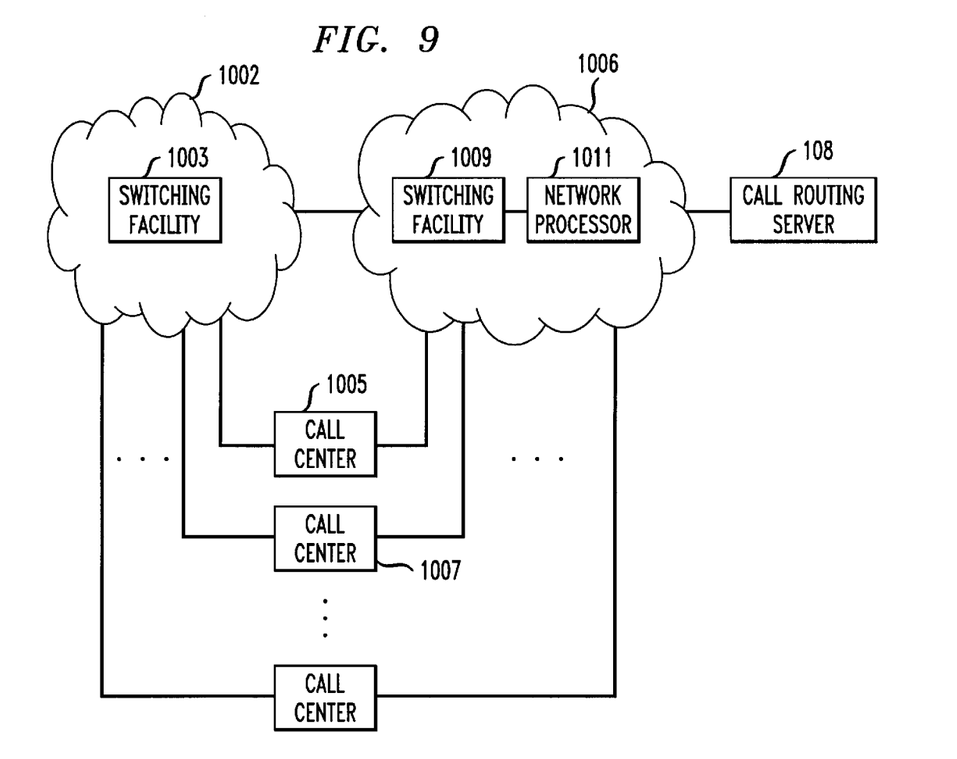
FIG. 9 illustrates a third arrangement where calls to an out-of-order call center is rerouted to a substitute call center in accordance with an inventive disaster recovery plan.

FIG. 9 illustrates another arrangement for use in a third embodiment of the invention. In this arrangement a call to a call center, say, center 1005, at a predetermined telephone number is normally routed by switching facility 1003 in first communication network 1002 to the call center, without regard for its availability in the first instance as in the arrangement of FIG. 1. However, in accordance with an aspect of the invention, disaster recovery measures are put in place here in case center 1005 is out of commission and the calls directed to center 1005 which would otherwise go unanswered are rerouted to alternate call centers. To that end, as soon as center 1005 is identified to be out of order, switching facility 1003 is programmed to switch each call otherwise directed to call center 1005 to switching facility 1009 in second communication network 1006. Facility 1009 is connected to network processor 1011 similar to above-described network processor 907. Like processor 907, processor 1011 queries call routing server 108 for an available call center to answer the call to call center 1005. Once processor 1011 receives from server 108 the routing information including an identity of the available call center, say, center 1007, processor 1011 communicates such information to facility 1009 which then causes the call in question to be routed to call center 1007 to be answered.

The foregoing merely illustrates the principles of the present invention. It will thus be appreciated that those skilled in the art will be able to devise numerous other arrangements which embody the principles of the invention and are thus within its spirit and scope.

For example, call center 102 and call routing server 108 are disclosed herein in a form in which various functions are performed by discrete functional blocks. However, any one or more of these functions could equally well be embodied in an arrangement in which the functions of any one or more of those blocks or, indeed, all of the functions thereof, are realized, for example, by one or more appropriately programmed processors.

What is claimed is:

1. Apparatus for controlling communication calls routed to a selected system where the communication calls are to be answered to provide information to callers of the communication calls, the apparatus comprising:

an input device for receiving measures of conditions concerning the selected system;

a processor for determining whether a communication call is to be rerouted based on the measures, a communication path in the selected system being reserved when it is determined that the communication call is to be rerouted; and an interface for sending a request from the selected system for identifying another system to which the communication call is to be rerouted, the communication call being transferred through the communication path to a second system, identified in a response to the request, for answering the communication call therein.

2. The apparatus of claim 1 wherein one of the measures is a function of the number of callers hanging up communication calls in the selected system after a predetermined answer delay.

3. The apparatus of claim 1 wherein one of the measures is a function of the number of communication calls being queued to be answered in the selected system.

4. The apparatus of claim 1 wherein one of the measures is a function of a duration of a communication call answered in the selected system.

5. The apparatus of claim 1 wherein one of the measures is a function of the number of communication calls answered in the selected system in a given period.

6. The apparatus of claim 1 wherein one of the measures is a function of the number of operators attending to the communication calls in the selected system.

7. The apparatus of claim 1 wherein one of the measures is a function of wait time before a communication call is answered in the selected system.

8. The apparatus of claim 1 wherein one of the measures is a function of the number of communication calls rerouted to the selected system from another system.

9. The apparatus of claim 1 wherein one of the measures is a function of the number of communication calls rerouted from the selected system to another system.

10. The apparatus of claim 1 wherein one of the measures is a function of the number of available communication paths for transporting communication calls out of the selected system.

11. The apparatus of claim 1 wherein one of the measures is a function of the number of communication calls, each of which is answered in the selected system within a predetermined time limit.

12. The apparatus of claim 1 wherein the communication call includes a telephone call.

13. The apparatus of claim 1 wherein at least one of the measures is weighted relative to another measure.

14. Apparatus for providing data for routing communication calls to a plurality of call centers where the communication calls are answered to provide information to callers of the communication calls, the apparatus comprising:

a receiving device for receiving measures of conditions concerning the call centers;

an interface for receiving a request from a first call center for identifying another call center to which a communication call received in the first call center is to be transferred; and a processor responsive to the request for selecting an alternate call center to receive the communication call based on at least measures of conditions concerning the alternate call center, data concerning at least an identity of the alternate call center being conveyed to the first call center when the alternate call center is selected.

15. The apparatus of claim 14 wherein the alternate call center is selected also based on a requirement concerning the first call center.

16. The apparatus of claim 15 wherein the requirement relates to a location of the first call center relative to that of the alternate call center.

17. The apparatus of claim 14 wherein the communication call is accorded a priority affecting an order of the communication call to be answered in the first call center, the priority being adjustable when no alternate call center is selected.

18. The apparatus of claim 14 wherein the communication call includes a telephone call.

19. The apparatus of claim 14 wherein one of the measures is a function of the number of available communication paths in the alternate call center for receiving communication calls.

20. The apparatus of claim 14 wherein one of the measures is a function of the number of callers hanging up communication calls in the alternate call center after a predetermined answer delay.

21. The apparatus of claim 14 wherein one of the measures is a function of the number of communication calls being queued to be answered in the alternate call center.

22. The apparatus of claim 14 wherein one of the measures is a function of a duration of a communication call answered in the alternate call center.

23. The apparatus of claim 14 wherein one of the measures is a function of the number of communication calls answered in the alternate call center in a given period.

24. The apparatus of claim 14 wherein one of the measures is a function of the number of operators attending to communication calls in the alternate call center.

25. The apparatus of claim 14 wherein one of the measures is a function of wait time before a communication call is answered in the alternate call center.

26. The apparatus of claim 14 wherein one of the measures is a function of the number of communication calls transferred to the alternate call center from a second call center.

27. The apparatus of claim 14 wherein one of the measures is a function of the number of communication calls transferred from the alternate call center to a second call center.

28. The apparatus of claim 14 wherein one of the measures is a function of the number of available communication paths for transporting communication calls out of the alternate call center.

29. The apparatus of claim 14 wherein one of the measures is a function of the number of communication calls, each of which is answered in the alternate call center within a predetermined time limit.

30. The apparatus of claim 14 wherein at least one of the measures is weighted relative to another measure.

31. A communications system comprising:

a plurality of call centers for receiving communication calls;

a server for analyzing measures of conditions concerning the call centers; and a processor for issuing to the server, over a communication network, a request for data identifying a call center to which a communication call received in a first call center is to be routed, the data being received in a response to the request, the processor causing the communication call to be routed from the first call center to a second call center based on the data, the server selecting the second call center based on an analysis of the measures of conditions concerning the second call center.

32. The system of claim 31 wherein the communication network includes a wide area network (WAN).

33. The system of claim 31 wherein the processor is in a call center.

34. The system of claim 31 wherein the processor serves a second communication network through which the communication calls are received by the call centers.

35. The system of claim 31 wherein the processor issues the request in response to an outage of the first call center.

36. The system of claim 31 wherein the communication call includes a telephone call.

37. The system of claim 31 wherein at least one of the measures is weighted relative to another measure.

38. A method for controlling communication calls routed to a selected system where the communication calls are to be answered to provide information to callers of the communication calls, the method comprising:

receiving measures of conditions concerning the selected system;

determining whether a communication call is to be rerouted based on the measures;

reserving a communication path in the selected system when it is determined that the communication call is to be rerouted; and sending a request from the selected system for identifying another system to which the communication call is to be rerouted, the communication call being transferred through the communication path to a second system, identified in a response to the request, for answering the communication call therein.

39. The method of claim 38 wherein one of the measures is a function of the number of callers hanging up communication calls in the selected system after a predetermined answer delay.

40. The method of claim 38 wherein one of the measures is a function of the number of communication calls being queued to be answered in the selected system.

41. The method of claim 38 wherein one of the measures is a function of a duration of a communication call answered in the selected system.

42. The method of claim 38 wherein one of the measures is a function of the number of communication calls answered in the selected system in a given period.

43. The method of claim 38 wherein one of the measures is a function of the number of operators attending to the communication calls in the selected system.

44. The method of claim 38 wherein one of the measures is a function of wait time before a communication call is answered in the selected system.

45. The method of claim 38 wherein one of the measures is a function of the number of communication calls rerouted to the selected system from another system.

46. The method of claim 38 wherein one of the measures is a function of the number of communication calls rerouted from the selected system to another system.

47. The method of claim 38 wherein one of the measures is a function of the number of available communication paths for transporting communication calls out of the selected system.

48. The method of claim 38 wherein one of the measures is a function of the number of communication calls, each of which is answered in the selected system within a predetermined time limit.

49. The method of claim 38 wherein the communication call includes a telephone call.

50. The method of claim 38 wherein at least one of the measures is weighted relative to another measure.

51. A method for providing data for routing communication calls to a plurality of call centers where the communication calls are answered to provide information to callers of the communication calls, the method comprising:
  receiving measures of conditions concerning the call centers;
  receiving a request from a first call center for identifying another call center to which a communication call is to be transferred;
  selecting an alternate call center to receive the communication call based on at least measures of conditions concerning the alternate call center; and
  conveying data concerning at least an identity of the alternate call center to the first call center when the alternate call center is selected.

52. The method of claim 51 wherein the alternate call center is selected also based on a requirement concerning the first call center.

53. The method of claim 52 wherein the requirement relates to a location of the first call center relative to that of the alternate call center.

54. The method of claim 51 wherein the communication call is accorded a priority affecting an order of the communication call to be answered in the first call center, the priority being adjustable when no alternate call center is selected.

55. The method of claim 51 wherein the communication call includes a telephone call.

56. The method of claim 51 wherein one of the measures is a function of the number of available communication paths in the alternate call center for receiving communication calls.

57. The method of claim 51 wherein one of the measures is a function of the number of callers hanging up communication calls in the alternate call center after a predetermined answer delay.

58. The method of claim 51 wherein one of the measures is a function of the number of communication calls being queued to be answered in the alternate call center.

59. The method of claim 51 wherein one of the measures is a function of a duration of a communication call answered in the alternate call center.

60. The method of claim 51 wherein one of the measures is a function of the number of communication calls answered in the alternate call center in a given period.

61. The method of claim 51 wherein one of the measures is a function of the number of operators attending to communication calls in the alternate call center.

62. The method of claim 51 wherein one of the measures is a function of wait time before a communication call is answered in the alternate call center.

63. The method of claim 51 wherein one of the measures is a function of the number of communication calls transferred to the alternate call center from a second call center.

64. The method of claim 51 wherein one of the measures is a function of the number of communication calls transferred from the alternate call center to a second call center.

65. The method of claim 51 wherein one of the measures is a function of the number of available communication paths for transporting communication calls out of the alternate call center.

66. The method of claim 51 wherein one of the measures is a function of the number of communication calls, each of which is answered in the alternate call center within a predetermined time limit.

67. The method of claim 51 wherein at least one of the measures is weighted relative to another measure.

68. A method for use in a communications system which includes a plurality of call centers for receiving communication calls, the method comprising:
  analyzing by a server measures of conditions concerning the call centers;
  issuing by a processor to the server, over a communication network, a request for data identifying a call center to which a communication call received in a first call center is to be routed, the data being received in response to the request; and
  causing the communication call to be routed from the first call center to a second call center based on the data, the server selecting the second call center based on an analysis of the measures of conditions concerning the second call center.

69. The method of claim 68 wherein the processor is in a call center.

70. The method of claim 68 wherein the processor serves a second communication network through which the communication calls are received by the call centers.

71. The method of claim 68 wherein the request is issued in response to an outage of the first call center.

72. The method of claim 68 wherein the communication call includes a telephone call.

73. The system of claim 68 wherein at least one of the measures is weighted relative to another measure.

* * * * *